No. 798,418. PATENTED AUG. 29, 1905.
G. JOHNSON.
CARBURETER.
APPLICATION FILED NOV. 14, 1904.
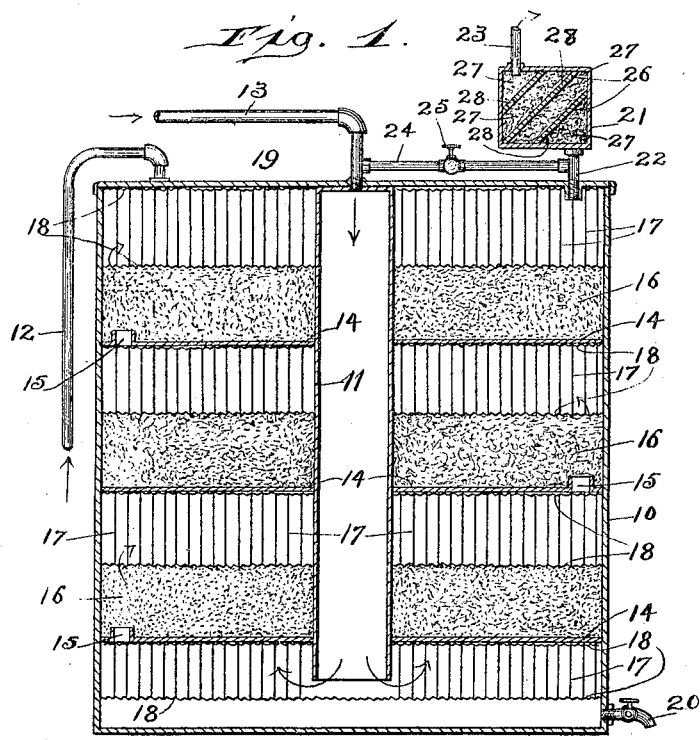
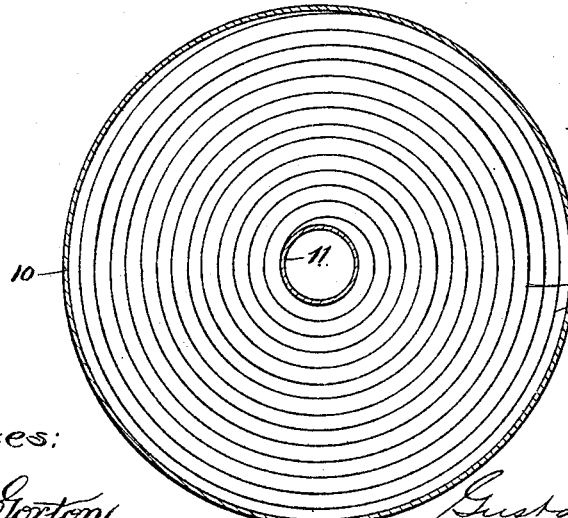
Witnesses:
Chas. E. Gorton.
A. Gustafson.
Inventor:
Gustaf Johnson.
By Chas. C. Tillman
Atty.

UNITED STATES PATENT OFFICE.

GUSTAF JOHNSON, OF CHICAGO, ILLINOIS, ASSIGNOR TO THE ILLINOIS LIGHT AND FUEL COMPANY, OF CHICAGO, ILLINOIS, A CORPORATION OF ILLINOIS.

CARBURETER.

No. 798,418.     Specification of Letters Patent.     Patented Aug. 29, 1905.

Application filed November 14, 1904. Serial No. 232,557.

*To all whom it may concern:*

Be it known that I, GUSTAF JOHNSON, a citizen of the United States, residing at Chicago, in the county of Cook and State of Illinois, have invented certain new and useful Improvements in Carbureters, of which the following is a specification.

This invention relates to improvements in machines used for carbureting air; and it consists in certain peculiarities of the construction, novel arrangement, and operation of the various parts thereof, as will be hereinafter more fully set forth and specifically claimed.

The object of the invention is to provide an apparatus of the above-named character which shall be simple in construction, easy to operate, and reasonable in cost of manufacturing.

A further object of the invention is to provide means for regulating the amount of air supplied to or mixed with the gas.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a central vertical sectional view of a carbureter embodying my invention. Fig. 2 is a plan sectional view of the inner and outer cylinders, showing the convoluted atomizing or porous material therebetween, but illustrating the supporting-screens therefor as being removed; and Fig. 3 is a fragmental perspective view of a portion of the said material and a part of the supporting-screens therefor.

Like numerals of reference refer to corresponding parts throughout the different views of the drawings.

The reference-numeral 10 indicates the outer or main receptacle of the machine, which may be made of any suitable size, form, and material, but preferably of metal and cylindrical in shape, as shown. Extending from the top of the receptacle 10 to near its bottom is an air-conduit 11, which is also preferably cylindrical in form and has its lower end open to permit of the discharge of air therefrom at or near the bottom of the main receptacle. Communicating with the main receptacle 10 in its upper portion is a supply-pipe 12, which leads to and communicates with a supply of gasolene or other hydrocarbon, which source of supply is not shown, but may be located at any suitable point or distance from the machine.

Communicating at one of its ends through the top of the receptacle 10 and with the upper portion of the air-conduit 11 is an air-supply pipe 13, the other end of which communicates with a supply of air under pressure. (Not shown.)

Horizontally located in the main receptacle 10 at suitable distances apart are a series of shelves or platforms 14, each of which is imperforate and surrounds the air-conduit 11 and may be secured thereto, as well as to the inner surface of the walls of the receptacle 10, in any suitable manner. Each of the shelves or platforms 14 is provided near its its outer edge with an upwardly-extending tube 15 or apertured projection. As shown, these tubes or apertured projections 15 project slightly above the upper surface of the shelves and are arranged so as to be located about diametrically opposite each other on the alternate shelves. Located on each of the shelves is a layer of cotton or asbestos 16, which layers may be of any desired thickness and extend from the air-conduit 11 to the walls of the main cylinder, so as to lie over the tubes or apertured projections 15 in the shelves.

Located between the lower surface of the top of the main receptacle 10 and the upper surface of the absorbent layer 16, adjacent thereto, and between the lower surface of each of the shelves 14 and the upper surface of each of the layers on the underlying shelves is a convoluted atomizer, which comprises a spirally-wound strip of cloth 17 or other suitable material, which is secured at its upper and lower edges to wire screens 18, the upper one of which may be fastened in any suitable manner to the lower surface of the top 19 of the main receptacle or to the lower surface of each of the shelves. The lower screen 18 will rest on or lie horizontally near the upper surface of the absorbent layers 16, as shown. The lower shelf in the main receptacle has secured to its lower surface a convoluted atomizer, to the lower edges of which is secured a wire screen 18, which is located a slight distance above the bottom of the main receptacle, as shown in Fig. 1 of the drawings. As each of the convoluted atomizers is made of cloth or other porous or foraminous flexible material, it is apparent that the weight of the lower screen 18 thereon will stretch the strip of cloth vertically, and as it is spirally wound with its layers or windings a slight distance apart there will be formed between the convoluted layers or windings spaces through which the volatilized hydrocarbon and air will pass, it being forced through the pores or small interstices of each of the layers by pressure, thus dividing the volume of air into small atoms or atomizing it.

The lower portion of the main receptacle 10 is provided with an outlet-pipe 20, which may lead to the oil-supply tank or any suitable point and is for the purpose of removing the overflow or excess of oil from the main receptacle.

Mounted on the top 19 of the main receptacle is a gas and air mixer 21, which communicates through a pipe 22 in its bottom with the interior of the main receptacle. Leading from the upper portion of the mixer 21 is a service-pipe 23, through which the gas may be supplied to suitable burners (not shown) used for illumination, heat, or for generating power. Communicating at one of its ends with the air-supply pipe 13 and at its other end with the pipe 22, which leads to the air and gas mixer, is a pipe 24, which is provided with a regulating-valve 25, which pipe and valve are employed for regulating the quantity of air to be mixed with the gas as it passes from the main receptacle to the mixer 21, which mixer is provided with a series of diagonally-disposed partitions 26, between which is located a quantity of cotton or asbestos 27 or other absorbent. Each of the partitions 26 is provided with an opening 28, and said openings are arranged alternately at or near the ends of the partitions, thus causing the mixture of gas and air to pursue a zigzag course through the absorbent material in the mixing vessel.

From the foregoing and by reference to the drawings it will be readily seen and clearly understood that by supplying oil through the pipe 12 to the upper portion of the receptacle 10 the layer of cotton or other absorbent material 16 on the upper shelf will become saturated therewith and that when a sufficient quantity of oil will have been supplied it will overflow from the upper shelf through the apertured projection 15 to the layer 16, below said upper shelf, and so on through the series of layers to the bottom of the vessel, from which the excess of oil may be drawn off through the pipe 20, as before stated. When thus supplied with oil, air under pressure may be admitted to the main receptacle 10 through the air-supply pipe 13 and conduit 11, from the lower end of the latter of which it will be discharged with considerable force, so as to force its way through the apertured projections 15 and through the absorbent layers 16, as well as through the convoluted layers of the atomizer 17, in which operation it will be charged with the volatilized hydrocarbon and will pass in the form of gas through the pipe 22 into the air and gas mixer 21, where it will be thoroughly mixed with air before it is discharged through the service-pipe 23 to the burners. It is apparent that the quantity of air added to the gas as it passes through the pipe 22 may be regulated by means of the valve 25 in the auxiliary pipe 24, which is employed for this purpose.

Having thus fully described my invention, what I claim as new, and desire to secure by Letters Patent, is—

1. In a carbureter, the combination with the main receptacle, of an oil-supply pipe and an air-supply pipe communicating therewith, a series of shelves horizontally located in said receptacle and each having an opening, a layer of absorbent material located on each of said shelves, and a spiral partition of reticulated material located above each of said layers, substantially as described.

2. In a carbureter, the combination with the main receptacle, of an air-conduit located therein and having its discharging end near the bottom of the receptacle, an oil-supply pipe communicating with the conduit, a series of shelves located in the receptacle and each having an opening, said openings being located diametrically opposite each other on the alternate shelves, a layer of absorbent material located on each of the shelves, and a spiral partition of reticulated material located above each of the said layers, substantially as described.

3. In a carbureter, the combination with the main receptacle, of an air-conduit located therein and having its discharging end near the bottom of the receptacle, an oil-supply pipe communicating with the receptacle, an air-supply pipe communicating with the conduit, a series of shelves horizontally located in the receptacle and each having an opening, a layer of absorbent material located on each of the shelves, a spiral partition of reticulated material located above each of said layers, and a wire screen secured to each of the edges of said strip and suitably supported at a distance apart, substantially as described.

4. In a carbureter, the combination with the main receptacle, of an oil-supply pipe and an air-supply pipe communicating therewith, a series of shelves horizontally located in the receptacle and each having an opening, a layer of absorbent material located on each of the shelves, a spiral partition of reticulated material located above each of said layers, and a wire screen secured to each of the edges of said strip and suitably supported within the receptacle at a distance apart, substantially as described.

GUSTAF JOHNSON.

Witnesses:
CHAS. C. TILLMAN,
A. GUSTAFSON.